(12) United States Patent
Zhang et al.

(10) Patent No.: US 12,065,611 B1
(45) Date of Patent: Aug. 20, 2024

(54) SIZED BRIDGING AGENTS, LOW DENSITY PILL AND FLUID COMPOSITIONS COMPRISING SAID AGENTS, AND METHODS OF CONTROLLING FLUID LOSS AND FORMATION DAMAGE USING SAID COMPOSITIONS

(71) Applicant: Schlumberger Technology Corporation, Sugar Land, TX (US)

(72) Inventors: Hui Zhang, Sugar Land, TX (US); Changping Sui, The Woodlands, TX (US); Zhipeng Wang, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/296,281

(22) Filed: Apr. 5, 2023

(51) Int. Cl.
  *C09K 8/502* (2006.01)
  *E21B 21/00* (2006.01)
  *E21B 37/06* (2006.01)

(52) U.S. Cl.
  CPC ............ *C09K 8/502* (2013.01); *E21B 21/003* (2013.01); *E21B 37/06* (2013.01); *C09K 2208/18* (2013.01)

(58) Field of Classification Search
  CPC . C09K 8/68; C09K 8/52; C09K 8/528; C09K 2208/18; C09K 8/03; E21B 37/06; E21B 21/003; E21B 33/138; E21B 33/13
  See application file for complete search history.

(56) References Cited

U.S. PATENT DOCUMENTS

2007/0078064 A1* 4/2007 Munoz ................. C09K 8/12
  507/117

FOREIGN PATENT DOCUMENTS

| CA | 2560939 C | * | 7/2012 | ............... C09K 8/03 |
| CA | 2991581 C | * | 3/2021 | ............... C09K 8/05 |

* cited by examiner

*Primary Examiner* — Zakiya W Bates
(74) *Attorney, Agent, or Firm* — Jeffrey D. Frantz

(57) ABSTRACT

Sized-bridging agents, wellbore fluid compositions including the agents, and methods utilizing said compositions control, reduce, or prevent fluid losses in wellbores and/or formation damages. One or more divalent organic salts disclosed herein are designed to help mitigate fluid loss by temporarily reducing the permeability of the formation around the wellbore. The sized-bridging agents include sized-divalent organic salts for forming one or more filter cakes to seal one or more portions of the wellbores thereby reducing rates of fluid loss and damages to formations.

20 Claims, No Drawings

SIZED BRIDGING AGENTS, LOW DENSITY PILL AND FLUID COMPOSITIONS COMPRISING SAID AGENTS, AND METHODS OF CONTROLLING FLUID LOSS AND FORMATION DAMAGE USING SAID COMPOSITIONS

FIELD OF THE DISCLOSURE

The present disclosure generally relates to wellbore fluid additives that are usable in low density pill and/or drilling fluid compositions for bridging and/or sealing one or more pores or fractures in subterranean wellbores or formations and/or one or more openings, slots, or slits of screen devices. The wellbore fluid additives disclosed herein are sized bridging agents for forming filter cakes on the one or more pores or fractures and/or the one or more openings, slots, or slits for blocking fluid loss and maintaining wellbore integrity. Additionally, the present disclosure generally relates to methods of controlling, reducing, and/or preventing fluid loss and formation damage by introducing wellbore fluid compositions comprising the sized bridging agents disclosed herein into the wellbores formed against the formations or screens.

BACKGROUND

The statements in this section merely provide background information related to the present disclosure and do not constitute prior art.

During the drilling of wellbores, various fluids are typically used in the wellbores for a variety of functions. The fluids may be circulated through drill pipes and drill bits into the wellbores, and then may subsequently flow upward through wellbores to the surface. During this circulation, the drilling fluids may act to remove drill cuttings from the bottoms of the wellbores to the surface, to suspend cuttings and weighting material when circulation is interrupted, to control subsurface pressures, to maintain the integrities of the wellbores until wellbore sections are cased and cemented, to isolate the fluids from the subterranean formations by providing sufficient hydrostatic pressures to prevent the ingress of formation fluids into the wellbores, to cool and lubricate the drill strings and drill bits, and/or to maximize penetration rates.

Upon completion of drilling each wellbore, a filter cake may develop on the surfaces of the wellbore from the accumulation of additives from a drilling fluid. This filter cake may stabilize the wellbore during subsequent completion operations such as placement of a gravel pack in the wellbore. Additionally, during completion operations, when fluid loss is suspected, a fluid loss control pill of polymers and/or bridging agents may be spotted into the wellbore to reduce or prevent such fluid loss by injection of other completion fluids behind the fluid loss control pill to a position within the wellbore which is immediately above a portion of the formation where fluid loss is suspected. Injection of fluids into the wellbore is then stopped, and fluid loss will then move the pill toward the fluid loss location. Typically, a cross-linked hydroxyethyl cellulose with calcium carbonate, rock salt or oil soluble resins can be used as a fluid loss control pill.

It is also known that reservoir drill-in fluids are used during the drilling process to minimize damage to the formation and/or increase the productivity of the wellbore. The reservoir drill-in fluids may be formulated or configured to provide the filter cake on the borehole walls of the formation to prevent the loss of drilling fluids and formation damage. Typically, the reservoir drill-in fluids are used after the drilling of a section of the wellbore is complete and before the installation of completion equipment and are formulated as low solids fluids with controlled particle size distribution to minimize formation damage. Also, the reservoir drill-in fluids may comprise one or more additional drilling fluid additives, such as, for example, polymers, surfactants, and bridging agents to improve their stability, lubricity, and filter cake properties.

After any completion operations have been accomplished, removal of the filter cake remaining on the sidewalls of the wellbore may be necessary. Although filter cake formation and use of fluid loss pills and/or reservoir drill-in fluids are often used in drilling and completion operations, the filter cake may present an impediment to the production of hydrocarbon or other fluids from the well, or to the injection of water and/or gas, if, for example, the rock formation is still plugged by the barrier. Because the filter cake is compact, it often adheres strongly to the formation and may not be readily or completely flushed out of the formation by fluid action alone.

Known sized-salt systems comprising bridging agents having sized sodium chloride particles are typically used in commercially available fluid loss control pills and/or reservoir drill in fluids. However, the minimum density of the known sized sodium chloride systems is 10.5 pounds per gallon (hereinafter "ppg") due to its high saturation density of 10.0 ppg in water. In contrast to these known sized-salt systems having such high densities, the low density pills and/or fluids disclosed herein and comprising the sized bridging agents also disclosed herein have improved densities that are lower than the known sized sodium chloride systems and achieve improved filter cake removal effectiveness and efficiencies.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one or more embodiments, wellbore fluid compositions for forming a filter cake are provided. The wellbore fluid compositions may comprise at least one of an aqueous-based carrier or a base oil, at least one viscosifier additive, and at least one bridging agent comprising at least one divalent organic salt in the form of sized-salt particles having particle sizes from about 2 microns to about 1000 microns, wherein the wellbore fluid composition is a fluid loss control pill composition or a reservoir drill in fluid composition.

In an embodiment, the at least one divalent organic salt may have a divalent cation comprising calcium or magnesium and an organic ion comprising carboxylate.

In an embodiment, the carboxylate may comprise acetate or formate.

In an embodiment, the at least one divalent organic salt may be present at a concentration of about 2 wt. % to about 30 wt. %, based on a total weight of the wellbore fluid composition.

In an embodiment, the concentration of the at least one divalent organic salt may be from about 3.5 wt. % to about 15 wt. %, based on the total weight of the wellbore fluid composition.

In an embodiment, the concentration of the at least one divalent organic salt may be from about 5 wt. % to about 11 wt. %, based on the total weight of the wellbore fluid composition.

In an embodiment, the wellbore fluid composition may have a density of about 8 ppg to about 15 ppg.

In an embodiment, the at least one viscosifier additive may be at least one divalent brine system viscosifier.

In an embodiment, the wellbore fluid composition may be a reservoir drill in fluid composition and the base oil is present and selected from the group consisting of mineral oil, hydrotreated light distillate or petroleum, and a combination thereof.

In an embodiment, the wellbore fluid composition may further comprise at least one self-destructive bridging agent for forming a self-degradable filter cake.

In an embodiment, the at least one self-destructive bridging agent may comprise polylactic acid.

In one or more embodiments, methods of controlling fluid loss in wellbore disposed in a subterranean formation are provided. The methods may comprise forming a filter cake on at least one surface associated with the wellbore by introducing the wellbore fluid composition of claim 1 into the wellbore.

In an embodiment, the at least one surface may comprise at least one selected from one or more pores of the formation, a fracture in the wellbore or the formation, an opening, slit, or slot of a screen device disposed within the wellbore, or a combination thereof.

In an embodiment, the methods may further comprise degrading the formed filter cake with a breaker fluid introduced into the wellbore.

In an embodiment, the breaker fluid of the methods may comprise at least one starch specific enzyme.

In an embodiment, the breaker fluid of the methods may comprise at least one organic precursor.

In an embodiment, the breaker fluid of the methods may comprise at least one scale inhibitor.

In an embodiment, the wellbore fluid composition of the methods may be a self-degradable fluid loss control pill.

In an embodiment, the methods may further comprise degrading the formed filter cake internally using self-destructive bridging solid for forming the filter cake.

In an embodiment, the self-destructive bridging solid of the methods may comprise polylactic acid.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." As used herein, the phrases "selected from the group consisting of," "chosen from," and the like include mixtures of the specified compounds and/or materials. Terms, such as, for example, "contains" and the like are meant to include "including at least" unless otherwise specifically noted.

Herein, the term "about" when applied to a value generally means within the tolerance range of the equipment used to produce the value, or in some examples, means plus or minus 20%, plus or minus 15%, plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Where a numerical limit or range is stated, the endpoints are included. Also, all values and subranges within a numerical limit or range are specifically included as if explicitly written out. Moreover, examples herein are intended to be illustrative only and are presented for discussion purposes and not by way of limitation.

Wellbore Fluid Additives

Embodiments disclosed herein relate to wellbore fluid additives that are usable in low density pill and/or drilling fluid compositions for bridging and/or sealing one or more pores or fractures in subterranean wellbores or formations and/or one or more openings, slots, or slits of screen devices. The wellbore fluid additives disclosed herein are, comprise, or consist of one or more divalent organic salts that may be usable as bridging agents for forming filter cakes on the one or more pores or fractures and/or the one or more openings, slots, or slits for blocking fluid loss and maintaining wellbore integrity. Additionally, the present disclosure generally relates to methods of controlling, reducing, and/or preventing fluid loss and formation damage by introducing low density pill and/or drilling fluid compositions comprising the divalent organic salts disclosed herein into the wellbores formed within the formations. Moreover, the methods disclosed herein may circulate pill and/or drilling fluid compositions into wellbores and/or during wellbore drilling operations and the pill and/or drilling fluid compositions may comprise one or more divalent organic salts as bridging agents for filter cakes formable on borehole walls of the wellbores.

Fluid Loss Control Pills

In one or more embodiments, the wellbore fluid additives disclosed herein may be, comprise, or consist of at least one fluid loss control pill composition or at least one lost circulation pill composition (collectively referred to hereinafter as "FLCP") which may comprise the one or more divalent organic salts and/or may be usable to control fluid loss in one or more drilling fluids. When drilling a wellbore, drilling fluids are pumped down the drill string and through the drill bit to cool and lubricate the drill bit and lift the drill cuttings to the surface. However, if the drilling fluids are not properly formulated or if the formation being drilled is porous or fractured, the drill fluid may leak into the formation, causing damage and potentially reducing well productivity. The FLCP comprising the one or more divalent organic salts disclosed herein are designed to help mitigate fluid loss by temporarily reducing the permeability of the formation around the wellbore. The FLCP comprising the one or more divalent organic salts may form one or more filter cakes and/or may seal one or more portions of wellbores thereby reducing the rates of fluid loss.

In addition to the one or more divalent organic salts, the FLCP may also comprise one or more of natural and synthetic materials, such as starch, cellulose, bentonite, polymers, or a combination thereof. The FLCP disclosed herein may be pre-made and pumped downhole or formed in situ by injecting a pill-forming material into the wellbore during a wellbore drilling or completing operation. In some embodiments, the methods disclosed herein may utilize the FLCP comprising the one or more divalent organic salts to reduce formation damage and/or increase well productivity by controlling the rate of fluid loss and maintaining wellbore stability.

In some embodiments, the FLCP may comprise or consist of one or more of the following components: one or more fibrous materials; at least one lost circulation material; one or more bridging agents; one or more binders; one or more lubricants; or a combination thereof. For example, the one or more fibrous materials may plug pore spaces in the wellbore formation or openings in the screen device disposed within the wellbore to prevent the loss of drilling or completion fluid. At least one lost circulation material may be usable to plug larger voids in the wellbore formation and/or larger openings in the screen device. Additionally, the one or more bridging agents may be usable to bridge smaller openings in the formation or the screen device and/or may control the permeability of the formation. Further, one or more binders may be usable to hold the pill together and/or prevent the pill from disintegrating in the wellbore fluid. Still further, the one or more lubricants may be added to the pill to help the pill slide down the drill pipe and into the wellbore.

Reservoir Drill in Fluids

In one or more embodiments, the wellbore fluids additives disclosed herein may be, comprise, or consist of at least one reservoir drill-in fluid composition (hereinafter "RDIF") which may be a drilling fluid composition comprising the one or more divalent organic salts and/or may be useable during a wellbore drilling operation to minimize damage to the reservoir rock and/or increase the productivity of the wellbore. The RDIF disclosed herein may form at least one stable and/or impermeable filter cake on at least one formation face and/or at least one borehole wall of the wellbore being drilled. As a result of the formed filter cake, RDIF may prevent the loss of drilling fluids and formation damage during the wellbore drilling operation. In some embodiments, the RDIF may be utilized after the drilling of a section of the wellbore is complete and/or before the installation of completion equipment. The RDIF may be formulated as a low solids' fluid with controlled particle size distribution to minimize formation damage. In addition, the RDIF may comprise one or more additives, such as, for example, one or more polymers, one or more surfactants, the one or more bridging agents disclosed herein, or at least one combination thereof which improve stability, lubricity, and/or filter cake properties of the RDIF.

In some embodiments, the RDIF may comprise or consist of one or more of the following components: at least one base fluid; one or more bridging agents; one or more polymers; one or more clay stabilizers; one or more corrosion inhibitors; one or more biocides; or a combination thereof. For example, the at least one base fluid may minimize damage to the reservoir formation during drilling, and/or the one or more bridging agents may control the permeability of the formation and/or prevent fluid invasion into the reservoir. Additionally, the one or more polymers may maintain the viscosity of RDIF and prevent fluid invasion into the reservoir, and/or the one or more clay stabilizers may prevent swelling and dispersion of clays in the reservoir formation. Further, the one or more corrosion inhibitors may be added to the RDIF to protect the drill string and other downhole equipment from corrosion and/or the one or more biocides may be added to the RDIF to prevent the growth of microorganisms that may damage the reservoir or the drilling equipment.

Bridging Agents

In one or more embodiments, the one or more divalent organic salts disclosed herein are bridging agents of the FLCP and/or the RDIF and are usable to bridge or seal one or more pore spaces in the wellbore formation and/or one or more openings, slits, and/or slots of the screen device. The bridging agents disclosed herein may be added to a drilling fluid composition, the FLCP, and/or the RDIF to plug or bridge openings in the wellbore formation and/or the screen device, to control the permeability of the formation, and/or to prevent the loss of drilling and/or completion fluid into the formation. As a result, the bridging agents disclosed herein may maintain the integrity of the wellbore, prevent formation damage, and/or improve drilling efficiency. In some embodiments, the bridging agents may be used in combination with other additives, such as, one or more weighting agents to achieve improved drilling fluid properties and/or may provide improved safe and efficient drilling operations.

Divalent Organic Salts

In one or more embodiments, the bridging agents disclosed herein may be at least one salt composed of one or more organic molecules that may contain two charged functional groups, which are capable of binding with at least one divalent cation. In at least one embodiment, the at least one divalent cation may be calcium or magnesium. The at least one salt may be at least one dicarboxylic acid salts or at least one dibasic acid salt and/or may be formed by the neutralization of the at least one dicarboxylic acid with one or more divalent metal ions. In at least one embodiment, the at least one dicarboxylic acid may be oxalic acid, malonic acid, or succinic acid. For example, the bridging agents disclosed herein may be the one or more divalent organic salts which may include calcium acetate $Ca(C_2H_3O_2)_2$, calcium succinate $(CaC_4H_4O_4)$, calcium formate $(Ca(HCOO)_2)$, calcium oxalate $(CaC_2O_4)$, calcium benzoate $(CaC_7H_8O_2)$, magnesium acetate $Mg(C_2H_3O_2)_2$, magnesium formate $Mg(HCOO)_2$, magnesium malate $(MgC_4H_4O_5)$, or a combination thereof.

In one or more embodiments, the one or more divalent organic salts may be sized-salt particles (hereinafter "sized-salts") having mean diameters greater than about 1 micron or about 2 microns and/or less than about 2500 microns or about 2000 microns. In an embodiment, the sized-salts comprise salt particles having a plurality of size gradings. Alternatively or additionally, the sized-salts may comprise salt particles having a plurality of shape types selected from beads, powders, spheres, ribbons, platelets, fibers, flakes, and so on, and combinations thereof. In at least one embodiment, the mean diameters of the sized-salts may be from about 2 microns to about 1000 microns, from about 5 microns to about 750 microns, from about 10 microns to about 500 microns, from about 20 microns to about 250 microns, from about 30 microns to about 100 microns, or from about 40 microns to about 50 microns.

In one or more embodiments, the sized-salts disclosed herein may have a particle size distribution to effectively seal the gravel packing screen, perforation tunnels and/or formation as needed to be an effective temporary fluid loss control for the formation. In embodiments, the sized-salts may have particle sizes less than or greater than about 100 mesh (about 150 microns), between about 150 and about 325 mesh (about 40 to about 100 microns), or less than or greater than about 325 mesh (about 40 microns). In general, larger particle sized-salts may be used to treat screens, very high permeability formations and formations with natural fissures, whereas smaller sizes may be used with lower permeability formations. In one embodiment, a mixture of particles of different sized-salts, for example a bimodal distribution, may be used. In some embodiments, the sized-salts disclosed herein may be sized to effectively seal or plug screen gauges of the screen device ranging from 2 gauge to 20 gauge which corresponds to gap sizes or openings ranging from about 50 microns to about 510 microns.

In some embodiments, the one or more divalent organic salts may be sized-salts that are, comprise, or consist of calcium formate, calcium acetate, magnesium formate, magnesium acetate, or a combination thereof. In an embodiment, the calcium formate is a white crystalline solid that is soluble in water and/or the calcium acetate, magnesium formate, and/or the magnesium acetate are/is a white crystalline powder that is soluble in water.

In some embodiments, the one or more divalent organic salts of the FLCP and/or the RDIF disclosed herein may control, prevent, and/or reduce fluid loss and/or effectively form filter cakes on borehole walls of wellbores and/or on openings, slits, or slots of screen devices during one or more wellbore drilling operations. Use of the FLCP and/or the RDIF disclosed herein may reduce the amounts of drilling and or completion fluids lost into the formations being drilled, improve drilling efficiencies, and/or maintain wellbore stabilities. The FLCP and/or the RDIF may create at least one filter cake on at least one borehole wall of the wellbore and/or at least one screen device within the wellbore which may block fluid loss into the formation associated with the wellbore. The filter cake may be formed by the deposition of the bridging agents disclosed herein, solid particles, and/or polymers from the FLCP and/or the RDIF onto the borehole wall or the screen device such that the bridging agents, solid particles and/or polymers may seal or plug pores and/or fractures in the formation and/or the openings, slits, or slots of the screen device. As a result, the FLCP and/or the RDIF may reduce or prevent the flow of drilling fluid into the formation. In at least one embodiment, the bridging agents added to the FLCP and/or the RDIF may improve the rheology and/or density of drilling fluid compositions in addition to reducing fluid losses of the wellbore fluids during wellbore drilling operations. As a result, the FLCP and/or the RDIF may control fluid loss in wellbore drilling operations and/or be usable in a plurality of drilling applications (i.e., onshore and offshore drilling) for maintaining wellbore stability and optimizing drilling efficiency.

In one or more embodiments, the density of the FLCP may range from about 8.5 ppg to about 14 ppg, from about 9 ppg (about 378 ppb) to about 13.5 ppg (about 567 ppb), or from about 9.2 ppg to 12.5 ppg. In some embodiments, the concentration of the sized-salts in the FLCP having a density of about 9 ppg may range from about 20 ppb to about 80 ppb or from about 5 wt. % to about 21 wt. %, based on a total weight of the FLCP. For example, when the FLCP may have a density of about 13.5 ppg, then the concentration of the sized-salts in the FLCP may range from about 3.5 wt. % to about 15 wt. %, based on the total weight of the FLCP. In at least one embodiment, the sized-salts may be present in the FLCP at a concentration ranging from about 2 wt. % to about 30 wt. %, based on the total weight of the FLCP.

Additional FLCP and/or RDIF Components

In one or more embodiments, the wellbore fluid compositions, the FLCP, and/or the RDIF disclosed herein may have, comprise, or consist of one or more of the following formulation/composition components: one or more brine carriers (hereinafter "the brine carrier"); one or more base oils (hereinafter "the base oil"); one or more primary viscosifier additives (hereinafter "the primary viscosifier"); one or more secondary viscosifier additives (hereinafter "the secondary viscosifier"); one or more fluid rheology stabilizers (hereinafter "the rheology stabilizer"); one or more lubricants (hereinafter "the lubricant"); one or more filtration control additives (hereinafter "the filtration additive"); one or more gum viscosifier additives (hereinafter "the gum additive"); one or more additional bridging agents (hereinafter "the additional bridging agent"); one or more pH control additives (hereinafter "the pH additive"); one or more anti-caking additives (hereinafter "the anti-caking additive"); or a combination thereof.

In some embodiments, the base oil may be, comprise, or consist of a water-in-oil (invert) fluid, a mineral oil, a hydrotreated light distillate and/or petroleum, hydrotreated kerosene, or a combination thereof. Additionally, the primary viscosifier may be, comprise, or consist of at least one divalent brine system primary viscosifiers additive, the secondary viscosifiers may be, comprise, or consist of at least one divalent brine system secondary viscosifiers, and/or the rheology stabilizer may be, comprise, or consist of at least one low-density divalent fluid rheology stabilizer. Further, the filtration additive may be, comprise, or consist of at least one non-ionic and/or starch derivative filtration-control additive, the gum additive may be, comprise, or consist of at least one clarified xanthan gum viscosifier, and/or the additional bridging agent may be, comprise, or consist of at least one self-destructive bridging agent. Still further, the pH additive may be, comprise, or consist of at least one lime or calcium oxide, and/or the anti-caking additive may be, comprise, or consist of sized sodium chloride particles and/or water-soluble primary bridging solids. Moreover, the lubricant may be, comprise, or consist of at least one water-soluble brine lubricant.

In one or more embodiments, the base oil may be, comprise, or consist of LVT 200 available from Deep South Chemical, Inc. (Brossard, LA) and/or the anti-caking additive may be, comprise, or consist of ULTRASAL® available from TBC-BRINADD, LLC (Houston, Tex). Further, the primary viscosifier may be, comprise, or consist of DI-TROL, the secondary viscosifiers may be, comprise, or consist of DI-BALANCE. Additionally, the rheology stabilizer may be, comprise, or consist of DI-LOK, the lubricant may be SAFE-LUBE, the filtration additive may be, comprise, or consist of FLO-TROL, and/or the gum additive may be, comprise, or consist of FLO-VIS PLUS, and/or the additional bridging agent may be, comprise, or consist of D-GRADE (4, 10, 20, 40, 100, 250, and/or HT 350), each available from M-I L.L.C. (Houston, Tex.).

In some embodiments, the wellbore fluid compositions, the FLCP, and/or the RDIF disclosed herein may comprise the brine carrier having a density of at least about 1.02 kg/L (about 8.5 ppg), but may be as low as about 1 kg/L (about 8.3 ppg). As used herein, a heavy brine, sometimes also called a high-density brine or high brine, is an aqueous inorganic salt solution having a specific gravity of greater than about 1.02 kg/L (about 8.5 ppg), about 1.08 kg/L (about 9 ppg) or about 1.14 kg/L (about 9.5 ppg), especially above about 1.2 kg/L, about 1.32 kg/L, about 1.44 kg/L or about 1.5 kg/L (about 10, about 11, about 12, or about 12.5 ppg), or up to about 1.8 kg/L (about 15 ppg). Available water, other than brine, may also be used in some embodiments as the brine carrier.

When used, the brine is water comprising an inorganic salt or organic salt. Embodiments of inorganic monovalent salts include alkali metal halides, more preferably sodium, potassium or cesium bromide. Embodiments of inorganic divalent salts include calcium halides, for example, calcium chloride or calcium bromide. Zinc halides, especially zinc bromide, may also be used. Inorganic salt can be added to the carrier fluid in any hydration state (e.g., anhydrous, monohydrated, dihydrated, etc.). The carrier brine phase may also comprise additional organic salt, in embodiments sodium or potassium formate, acetate or the like, which may be added to the treatment fluid up to a concentration at which phase separation might occur, approximately about 1.14 kg/L (about 9.5 ppg). In an embodiment, mixture of organic and inorganic salts can achieve a density higher than about 1.2 kg/L (about 10 ppg) or lower than about 9.5 ppg or about 9.0 ppg. The salt in one embodiment may be compatible with the drilling fluid composition which was used to drill the wellbore, or in a completion/clean up fluid, e.g., the salt may be the same as the salt used in the drilling fluid and/or other completion fluids.

In some embodiments, the wellbore fluid compositions, the FLCP, and/or the RDIF disclosed herein may be prepared with or without a thickening agent, such as, for example, at least one polymer. In an embodiment, the degradable filter cake may have a specific gravity that is similar to an aqueous carrier fluid such as fresh water or brine so that a high viscosity or other rheological modifications are not necessary to maintain dispersion of the bridging agent in the carrier fluid. Thus, where a polymer-free filter cake is desired, the wellbore fluid compositions, the FLCP, and/or the RDIF disclosed herein may be essentially free of polymer, i.e., slickwater. If a polymer is used to generate viscosity, only a minimal fluid viscosity can be sufficient to prevent undue settling of the bridging agent during preparation and placement of the wellbore fluid compositions, the FLCP, and/or the RDIF within the wellbore. Since the present disclosure can allow better sealing by the bridging agent in the filter cake, a lower concentration of polymer can be utilized to facilitate a primary goal of avoiding formation damage.

Embodiments of polymer concentrations, when present, can vary with temperature, fluid system, formation depth and bridging agent properties and loading, screen size, permeability, gravel size, and the like, but non-limiting exemplary ranges can include about 0.12 g/L to about 9.6 g/L (about 1 lb to about 80 lb of polymer per 1000 gallons), or about 1.2 g/L to about 4.8 g/L (about 10 to about 40 lb of polymer per 1000 gallons). In embodiments, polymers may include galactomannans such as guar, derivatized guars such as hydroxypropyl guar, carboxymethyl guar, carboxymethylhydroxypropyl guar, hydrophobically modified galactomannans, xanthan gum, hydroxyethyl cellulose, and polymers, copolymers and terpolymers containing acrylamide monomer, and the like.

Some non-limiting examples of suitable polymers include: polysaccharides, such as, for example, guar gums, high-molecular weight polysaccharides composed of mannose and galactose sugars, including guar derivatives such as hydroxypropyl guar, carboxymethyl guar, and carboxymethylhydroxypropyl guar, and other polysaccharides such as xanthan, diutan, and scleroglucan; cellulose derivatives such as hydroxyethyl cellulose, hydroxypropyl cellulose, carboxymethylhydroxypropyl cellulose, and the like; synthetic polymers such as, but not limited to, acrylic and methacrylic acid, ester and amide polymers and copolymers, polyalkylene oxides such as polymers and copolymers of ethylene glycol, propylene glycol or oxide, and the like. The polymers are preferably water soluble. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups.

As used herein, when a polymer is referred to as comprising a monomer or comonomer, the monomer is present in the polymer in the polymerized form of the monomer or in the derivative form of the monomer. However, for ease of reference the phrase comprising the (respective) monomer or the like may be used as shorthand.

In at least one embodiment, the polymers may optionally be cross-linked with polyvalent cations such as borate or metal ions, for example, zirconium or titanium including complexed metals, and so on. While linear (non-cross-linked) polymer systems can be used in an embodiment, they generally require higher polymer levels for the same rheological modification. In some embodiments, the fluids used may further include a cross-linker. Adding cross-linkers to the fluid may further augment the viscosity of the fluid. Cross-linking consists of the attachment of two polymeric chains through the chemical association of such chains to a common element or chemical group.

Optional Fluid Additives

Optional wellbore fluid additives may be added to, incorporated into, mixed into, or included in the wellbore fluid compositions disclosed herein. The optional wellbore fluid additives may include one or more rheological additives, one or more polymeric shale inhibitor additives, or at least one mixture thereof. For example, the one or more rheological additives may comprise one or more viscosifying agents, and the one or more polymeric shale inhibitor additives may comprise one or more encapsulating polymer agents. Other known wellbore fluid additives may be incorporated into the wellbore fluid compositions disclosed herein as known to one of ordinary skill in the art.

The one or more viscosifying agents may alter or maintain the viscosity and potential changes in viscosity of the wellbore fluid compositions. Viscosity control may be needed in some scenarios in which a subterranean formation contains varying temperature zones. For example, the wellbore fluid compositions may undergo temperature extremes of nearly freezing temperatures to nearly the boiling temperature of water or higher as the wellbore fluid compositions move from the surface to the drill bit and back to the surface.

In one or more embodiments, the one or more viscosifying agents may be selected from one or more natural biopolymers that are usable in WBM. In embodiments, the one or more natural biopolymers may include starches, celluloses, and/or various gums, such as xanthan gum, diutan gum, gellan gum, welan gum, schleroglucan gum and/or at least one or more mixtures thereof. Said starches may include potato starch, corn starch, tapioca starch, wheat starch, rice starch, and/or at least one mixture thereof. In some embodiments, the one or more viscosifying agents may comprise at least one gum, such as, for, example, xanthan gum, diutan gum, or mixtures thereof. In accordance with various embodiments of the present disclosure, the one or more biopolymer viscosifying agents may be unmodified (i.e., without derivatization). In embodiments, the one or more viscosifying agents may include, for example, at least one of POLYPAC® UL polyanionic cellulose (PAC), DUOVIS®, and BIOVIS®, each available from M-I L.L.C. (Houston, Tex.).

In some embodiments, one or more viscosifying agents may be one or more polymeric viscosifiers comprising synthetic polymers that resist degradation over time, and/or under high temperature/high pressure conditions. Thermal and pressure stable polymeric viscosifiers polymers may include polymers, copolymers, block copolymers, and higher order copolymers (i.e., a terpolymer or quaternary polymer, etc.) composed of monomers that may include 2-acrylamido-2-methylpropanesulfonate, acrylamide, methacrylamide, N,N dimethyl acrylamide, N,N dimethyl methacrylamide, tetrafluoroethylene, dimethylaminopropyl methacrylamide, N-vinyl-2-pyrrolidone, N-vinyl-3-methyl-2-pyrrolidone, N-vinyl-4,4-diethyl-2-pyrrolidone, 5-isobutyl-2-pyrrolidone, N-vinyl-3-methyl-2-pyrrolidone, alkyl oxazoline, poly(2-ethyl-2-oxazoline), C2-C12 olefins, ethylene, propylene, butene, butadiene, vinyl aromatics, styrene, alkylstyrene, acrylic acid, methacrylic acid, vinyl alcohol, partially hydrolyzed acrylamide or methacrylamide, derivatives thereof, and/or mixtures thereof. In yet other embodiments, polymeric viscosifiers may include polyalkylene amines and polyethers, such as, for example, polyethylene oxides, polypropylene oxide, and/or mixtures thereof.

In one or more embodiments, the polymeric viscosifiers may include, for example, thermally stable polymeric viscosifiers, such as, for example, DUROTHERM™ DURALON™, available from MI, L.L.C. (Houston, Tex.), KEMSEAL™, available from Baker Hughes, Inc. (Houston, Tex.), DRISCAL®-D, available from Phillips Petroleum Co. (Bartlesville, Olka), CYPAN™, available from National Oilwell Varco (Houston, Tex.), and ALCOMER™ 242, available from Allied Colloids Ltd (United Kingdom). In other embodiments, the one or more viscosifying agents may be, for example, IDCAP™ D, available from MI L.L.C. (Houston, Tex.).

In embodiments, the one or more viscosifying agents may comprise additional components comprising at least one organic compound. The additional components may be compounds comprising at least one aldehyde group or two aldehyde groups. For example, the at least one organic compound may be a dialdehyde, such as, for example, glyoxal.

The wellbore fluid compositions disclosed herein may contain one or more viscosifying agents in an amount of about 0.5 to about 5 pounds per barrel (hereinafter "ppb"), about 0.25 to about 2 ppb, or up to about 4 ppb. However, the concentration ranges may be dependent upon, for example, particular wellbore diameters, annular velocities, cutting carrying capacities, and/or quiescent times expected or desired. The one or more viscosifying agents may have, but are not limited to, viscosities of about 1.2 to about 1.8 Pa*s or about 1.1 to about 1.9 Pa*s and a specific gravity of about 1.2 to about 1.8, about 1.4 to about 1.6, or about 1.5. In some embodiments, the amount of the one or more viscosifying agents may be less than about 0.5 ppb or greater than about 5 ppb and/or the viscosity may be less than about 1.2 Pa*s or greater than about 1.9 Pa*s.

In one or more embodiments, the wellbore fluid compositions disclosed herein may comprise one or more encapsulating polymer agents that may form a viscous polymer coating, film, or barrier on, for example, cuttings and walls of the wellbores. The viscous polymer coating, film, or barrier may seal microfractures of the wellbores and/or formations. In embodiments, the one or more encapsulating polymer agents may comprise at least one of one or more partially-hydrolyzed polyacrylamides, one or more acrylate polymers, one or more acrylate copolymers, and mixtures thereof. In an embodiment, the one or more encapsulating polymer agents may be acrylic acid copolymer encapsulators. The one or more encapsulating polymer agents may be present in the wellbore fluid compositions at concentrations of about 1 kg/m$^3$ to about 12 kg/m$^3$, or no more than about 3 or about 4 vol. %, calculated to total volumes of the wellbore fluid compositions. In embodiments, the one or more encapsulating polymer agents may have specific gravities of about 1.2 to about 1.8 or about 1.4 to about 1.6.

Moreover, the wellbore fluid compositions disclosed herein may include weight materials or weighting agents to increase the densities of the wellbore fluid compositions. The weighting materials or agents may increase the densities of the wellbore fluid compositions so as to prevent kickbacks and blow-outs. Thus, the weighting materials or agents may be added to the wellbore fluids in functionally effective amounts largely dependent on the nature of the subterranean formations being drilled. Weighting agents or density materials usable in the wellbore fluid compositions disclosed herein include galena, hematite, magnetite, iron oxides, ilmenite, barite, siderite, celestite, dolomite, calcite, and the like, mixtures and combinations of these compounds and similar such weight materials that may be used in the formulations of the wellbore fluid compositions. The quantity of such material added, if any, may depend upon the desired density of the final compositions of the wellbore fluid compositions. In some instances, weighting agent is added to result in a drilling fluid density of at least about 9 and/or up to about 24 ppg. The weighting agent may be added up to about 21 ppg in some embodiments, and up to about 19.5 ppg in other embodiments. In one or more embodiments, the density of the drilling fluids disclosed herein may be at least about 9 ppg, at least about 11 ppg, or at least about 13 ppg.

In some embodiments, the other wellbore fluid additives may also include, for example, one or more thinners and/or one or more fluid loss control agents which may be optionally added to wellbore fluid compositions disclosed herein. Of these additional materials, each may be added to the formulation in a concentration as rheologically and functionally required by wellbore drilling conditions and/or operations.

Wellbore Fluids

Wellbore fluid compositions disclosed herein may contain a base fluid that is entirely aqueous base or contains a full or partial oil-in-water emulsion. Alternatively, the wellbore fluid compositions disclosed herein may be, comprise, or consist of at least one oil-based wellbore fluid. In some embodiments, the wellbore fluid compositions may be, comprise, or consist of any base fluid that is compatible with the wellbore fluid additives, the bridging agents, the one or more divalent organic salts, and/or the sized salts disclosed herein. In some embodiments, the base fluid may include at least one of fresh water or mixtures of water-soluble organic compounds and water. In other embodiments, the base fluid may be an emulsion, such as, for example, a direct emulsion or inverted emulsion. Moreover, the present wellbore fluid compositions may comprise one or more of the base fluid, the bridging agents, the one or more divalent organic salts, the sized salts, or a combination thereof as disclosed herein.

In one or more embodiments, the wellbore fluid compositions may contain a brine such as seawater, aqueous base fluids, or solutions wherein the salt concentration is less than that of sea water, or aqueous fluids or solutions wherein the salt concentration is greater than that of sea water. Salts that may be found in seawater include, but are not limited to, sodium, calcium, aluminum, magnesium, potassium, strontium, lithium, and salts of chlorides, bromides, carbonates, iodides, chlorates, bromates, formates, nitrates, oxides, sulfates, phosphates, silicates and fluorides. Salts that may be incorporated into given brines include any one or more of those present in natural seawater or any other organic or inorganic dissolved salts. Additionally, brines that may be used in the wellbore fluid compositions disclosed herein may be natural or synthetic, with synthetic brines tending to be much simpler in constitution. One of ordinary skill would appreciate that the above salts may be present in the base fluids or may be added according to the methods disclosed herein. Further, the amount of the aqueous based continuous phase should be sufficient to form the WBM. This amount may range from nearly 100% of the wellbore fluid compositions to less than about 30% of the wellbore fluid compositions by volume. In some embodiments, the aqueous-based continuous phase may constitute from about 98 to about 25% by volume, from about 95 to about 30% by volume, or from about 90 to about 40% by volume of the wellbore fluid compositions.

In some embodiments, the wellbore fluid compositions disclosed herein may be high performance WBMs comprising wellbore fluid additives disclosed herein for reducing or preventing fluid loss with respect to the wellbore or formation and/or for sealing one or more surfaces of the wellbore or formation. Prevention of fluid loss may be important to WBM performance because wellbore integrity depends on fluid loss properties of WBM. Additionally, prevention and/or reduction in fluid loss reduces costs associated with the wellbore drilling operations or processes by reducing the volumes of dilution needed to maintain acceptable viscosities for the WBMs. In embodiments, the high performance WBMs disclosed herein may comprise at least the aqueous base fluid, the wellbore fluid additives disclosed herein, one or more viscosifying agents, and one or more encapsulating polymer agents, or a mixture thereof. The wellbore fluid compositions disclosed herein may have pH values of less than about 11.5, about 5.0 to about 11, about 6.0 to about 10, about 7 to about 9, greater than about 10, or greater than about 11.

In yet another embodiment, the wellbore fluid compositions disclosed herein may be used alone or in combination with one or more optional, conventional, or additional additives (collectively referred to hereinafter as "the additional additives"). The additional additives, that may further be included in the present wellbore fluid compositions, may include, for example, wetting agents, organophilic clays, additional viscosifiers, fluid loss control agents, surfactants, dispersants, interfacial tension reducers, pH buffers, mutual solvents, additional thinners, additional thinning agents, cleaning agents, or mixtures thereof. Inclusion of the additional additives in the present wellbore fluid compositions should be well known to one of ordinary skill in the art of formulating wellbore fluid compositions, WBMs, aqueous-based drilling fluids, or a combination thereof.

Embodiments of the present disclosure may use other additives and chemicals that are known to be commonly used in oilfield applications by those skilled in the art. These include, but are not necessarily limited to, materials in addition to those mentioned hereinabove, such as breaker aids, oxygen scavengers, alcohols, antifoaming agents, pH buffers, scale inhibitors, corrosion inhibitors, fluid-loss additives, bactericides, iron control agents, organic solvents, water control agents and cleanup additives, gas components, and the like, depending on the intended use of the wellbore fluid compositions, the FLCP, and/or the RDIF, formation conditions and other parameters readily apparent to one of ordinary skill in the art. For example, drilling fluids may further comprise surface active agents, other viscosifiers such as polymers, filtration control agents such as Gilsonite and modified starches, density increasing agents such as powdered barites or hematite or calcium carbonate, or other wellbore fluid additives known to those skilled in the art.

Methods

In one or more embodiments, the methods disclosed herein may include providing, formulating, and/or mixing a wellbore fluid composition (e.g., a drilling fluid, the RDIF, fracturing fluid, etc.) and/or the FLCP, wherein the wellbore fluid composition, the RDIF, and/or the FLCP contains or comprises the one or more divalent organic salts as bridging agents. In some embodiments, the methods disclosed herein may emplace, dispose, and/or provide the wellbore fluid compositions and/or the FLCP within wellbores of subterranean formations. The above-mentioned bridging agents may be mixed into the wellbore fluid compositions, the FLCP, and/or the RDIF individually or as a multi-component additive that contains the bridging agents and additional additives selected from the one or more divalent organic salts, the sized salts, the brine carrier, the base oil, the primary viscosifiers, the secondary viscosifiers, the rheology stabilizer, the lubricant, the filtration additive, the gum additive, the additional bridging agent, the pH additive, and/or the anti-caking additive as disclosed herein. The above-mentioned bridging agents and/or the additional additives may be added to the wellbore fluid compositions and/or FLCP prior to, during, or subsequent to emplacing or circulating the wellbore fluid compositions and/or the FLCP in the subterranean formations.

The wellbore fluid compositions and/or the FLCP comprising the bridging agents disclosed herein may be used in methods or operations for drilling wellbores into the subterranean formations in a manner similar to those wherein conventional wellbore fluids and/or FLCP are used. In the methods of drilling, the wellbore fluid compositions and/or FLCP disclosed herein may be circulated through the drill pipe, through the bit, and up the annular space between the pipe and the formation or steel casing to the surface. The wellbore fluid compositions and/or FLCP disclosed herein may perform several different functions during the methods or operations, such as, for example, cooling the bit, removing drilled cuttings from the bottom of the hole, suspending, coating, and/or encapsulating the cuttings, coating walls of the wellbore and/or one or more surface of the screen device, and/or weighting the material within the wellbore when circulation is interrupted.

The bridging agents disclosed herein may be added to the base fluids on location at a well-site where it is to be used, or may carried out at other locations than the well-site. If the well-site location is selected for carrying out this step, the bridging agents disclosed herein may be dispersed in the base fluids, and the resulting wellbore fluid compositions or the FLCP may be emplaced, disposed, and/or circulated in the wellbores using techniques known in the art. In one or more embodiments, the components of wellbore fluid compositions, the FLCP, and/or the RDIF disclosed herein may be added to the wellbores simultaneously or sequentially, depending on the demands of the downhole environments. In some embodiments, the wellbore fluid compositions, the FLCP, and/or the RDIF disclosed herein may be emplaced or provided into the wellbores before or after adding one or more preflush or overflush fluids.

In some embodiments, the methods utilize the FLCP and/or the RDIF comprising the bridging agents disclosed herein to prevent or reduce fluid losses in the wellbores. The methods, the FLCP, the RDIF, and/or wellbore fluid compositions disclosed herein may be utilized in a variety of subterranean operations that involve subterranean drilling, drilling-in (without displacement of the fluid for completion operations) and/or fracturing. Examples of suitable subterranean drilling operations include, but are not limited to, water well drilling, oil/gas well drilling, utilities drilling, tunneling, construction/installation of subterranean pipelines and service lines, and the like. In some embodiments, the methods, the FLCP, the RDIF, and/or wellbore fluid compositions disclosed herein may be used to stimulate the fluid production.

In one embodiment, the methods disclosed herein may circulate the RDIF or a wellbore fluid composition comprising the FLCP into a wellbore to form a filter cake to inhibit fluid entry from the well into the formation. In one embodiment, the methods may include degrading the formed filter cake with at least one breaker or at least one breaker fluid (collectively referred to hereinafter as "the breaker") comprising at least one organic acid precursor and at least one starch specific enzyme. The filter cake may be made up of the divalent organic salts comprising the one or more sized-salts disclosed herein as the bridging agent. In an embodiment, the filter cake may be degraded at a higher rate by an accelerator which includes at least one starch specific enzyme. Depending on downhole conditions, a suitable combination of organic acid precursor and the starch specific enzyme may be used to provide variable degradation rate of the filter cake and adequate stability at related temperatures. In embodiments, the organic acid precursor may be D-STRUCTOR, available from M-I L.L.C. (Houston, Tex.), and/or may be present in the breaker at a concentration range from about 0.1 V % to about 17.5 V %, from about 0.5 V % to about 15 V %, from about 1 V % to about 10 V %, from about 2 V % to about 7.5 V %, or from about 3 V % to about 7 V %. Further, the starch specific enzyme may be WELLZYME A, available from M-I L.L.C. (Houston, Tex.), and/or may be present in the breaker at a concentration range from about 0.5 V % to about 20 V %, from about 1 V % to about 15 V %, from about 2 V % to about 12 V %, from about 3 V % to about 10 V %, or from about 4 V % to about 8 V %.

In one or more embodiments, the methods disclosed herein may be applied to a formation that is suitable for gravel packing, such as unconsolidated sand, for example, a formation having a compressive strength less than about 6.9 MPa (about 1000 psi). In an embodiment, the formation may have a permeability greater than about 10 mD, or greater than about 50 mD. In some embodiments, the methods disclosed herein may comprise at least one completion operation that may include cleanout, gravel packing, or the like, or a combination thereof. In an embodiment, the filter cake may plug the pores of the formation, at least one fracture in the wellbore or the formation, at least one opening, slit, or slot of the screen device, and/or a perforation tunnel, e.g., in a cased-hole completion, until cleanout. Because the filter cake can degrade spontaneously after a certain period of time at the downhole conditions and/or exposure to the breaker, the methods may effectively remove the filtercake to facilitate proper gravel placement in the perforation tunnels. In an embodiment, the methods may facilitate filter cake removal even without a distinct flushing step or may include backflow flushing of filter cake residue wherein flushing fluid consists essentially of reservoir fluid produced in situ from the formation after the filter cake is formed. In another embodiment, reservoir fluid can be produced directly from the formation without intermediate recirculation of a flushing fluid in the well to remove filter cake residue.

In some embodiments, the FLCP and/or the RDIF disclosed herein may be used to control leak-off of completion brine after perforating and before gravel packing or frac-packing. The FLCP and/or the RDIF may also be used in an additional or alternate embodiment to isolate the completion and wellbore fluid after gravel packing by spotting the FLCP and/or the RDIF inside the screen device. In an embodiment, the bridging agents of the FLCP and/or RDIF comprises the sized-salts such that the sized-salts block the openings in the screen device, the pores of the formation, the fractures in the wellbore or the formation, or a combination thereof. Further, the filter cake may degrade after temporarily sealing for fluid loss during the treatment and/or drilling operation and/or may help restore permeability and conductivity for reservoir fluid production. In an alternative or additional embodiment, the entire filter cake need not be entirely soluble following degradation; it may be sufficient only that enough degradation occurs so as to allow the residue of the degraded or partially degraded filter cake to be lifted off of the sealed surface by a low backflow pressure from produced reservoir fluids.

In one or more embodiments, the one or more divalent organic salts comprising the sized-salts disclosed herein may be used in conjunction with other materials that aid in controlling fluid loss, such as silica flour, mica, or polymers such as starch or guars, provided either that the additional material is at least partially degraded after closure, or is present in a sufficiently small amount that it does not seriously detract from the efficacy of the treatment. The filter cake need not be entirely broken; it is sufficient only that enough breaking occurs so as to allow the filter cake residue to be lifted off of the sealed surface by a low backflow pressure from produced reservoir fluids. In an embodiment, complete or essentially complete elimination of flow impairment from the formation through the temporarily sealed surface may be achieved.

In some embodiments, the wellbore fluid compositions, the FLCP, and/or the RDIF disclosed herein may be used to seal the formation face in the completion zone. The methods may be applicable to open hole or cased completion zones, for example. Open hole completions in an embodiment include underreamed zones wherein the producing formation is underreamed to enhance productivity. The wellbore fluid compositions, the FLCP, and/or the RDIF described herein may be positioned in the wellbore to contact the formation face and overbalanced to force the liquid carrier into the formation and form a filtercake by screening the bridging agent particles at the entrances to the pores or other passages opening at the formation surface.

The filter cake formed, in one embodiment, does not substantially degrade until the completion operations are finished and it may be desired to produce the well. The well should be kept at least slightly overbalanced in one embodiment to keep the filter cake from being prematurely lifted off a screen. In embodiments, the well can be shut in for a period of time for the bridging agent particles to degrade and/or dissolve, or can be placed in production for the backflow of reservoir fluid to facilitate flushing of any filter cake residue from the screen.

In one or more embodiments, the wellbore fluid compositions, the FLCP, and/or the RDIF disclosed herein comprise the one or more divalent organic salts in the form of the sized-salts to replace conventional calcium carbonate as bridging agent. Good water solubility of the sized-salts makes the FLCP workable for direct injector well applications since the filter cake formed with the sized-salts of the FLCP may be easily removed with a combination of undersaturated injection water and starch-specific enzymes. The wellbore fluid compositions, the FLCP, and/or the RDIF disclosed herein may have densities lower than about 10 ppg. To achieve the low density of less than 10 ppg, the one or more divalent organic salts comprising the sized-salts are incorporated into the wellbore fluid compositions, the FLCP, and/or the RDIF instead of conventional calcium carbonate. As a result, the FLCP disclosed herein may have a density of less than or equal to about 9.5 ppg. The density of the FLCP comprising the sized-salts may be limited by the density of saturated brine. For substantially low density (i.e., less than about 9 ppg) FLCP comprising the sized-salts, a direct emulsion system may be used by replacing partial saturated brine with base oil, such as, for example, at least one mineral oil as the external phase. As a result, the low density FLCP comprising the sized-salts may achieve a density of about 9 ppg or less.

In some embodiments, the FLCP comprising the sized-salts may be, comprise, or consist of a self-degradable FLCP using polylactic acid (hereinafter "PLA") as bridging solids to achieve performance improvements to the FLCP. Use of sized-salts as bridging solid may primarily achieve good fluid loss control at various temperatures, especially for high temperatures benefiting from insensitivity of solubility of salt to temperature. Further, incorporating sufficient PLA into the FLCP as resource of acid may break down the polymers to gain good cleaning up of the filter cake formed by the FLCP. Still further, the PLA may be used as a secondary bridging solid for optimum bridging in the FLCP.

EXAMPLES

Four base brines including 9.21 ppg Ca formate, 10.0 ppg NaCl, 11.0 ppg Na formate, and 12.5 ppg NaBr were evaluated to formulate with FLCP with Ca formate as primary bridging solid and PLA as internal breaker. Test results are set forth in TABLES 1-13.

Example 1

Example 1 comprises an inventive formulation for a 9.5 ppg drilling fluid formulated with 9.21 ppg saturated brine as set forth in TABLE 1. Experimental data comprising fluid rheology data and breaker test results for Example 1 are set forth TABLES 2 and 3.

TABLE 1

Formulation for inventive drilling fluid having a density of 9.5 ppg.

| Components | Conc. (ppb) |
|---|---|
| Divalent brine system primary viscosifiers | 12 |
| Divalent brine system secondary viscosifier | 3 |
| Low-density divalent fluid rheology stabilizer | 0.5 |
| Ca(HCO$_2$)$_2$ salt | 20 |
| 9.21 ppg Ca(HCO$_2$)$_2$ brine | 305.6 |

TABLE 2

Fluid rheology for the formulation of Example 1 at 120° F.

| Fann 35@120F | BH | AH |
|---|---|---|
| 600 | 48.5 | 85 |
| 300 | 36.5 | 64 |
| 200 | 31.5 | 55 |
| 100 | 24 | 42 |
| 6 | 9.8 | 19 |
| 3 | 8 | 17 |

TABLE 3

Breaker test results for the formulation of Example 1.

| | |
|---|---|
| Soaking period, Days | 3 |
| acid precursor, V % | 5 |
| enzyme, V % | 10 |
| Soaking Temp, ° F. | 150 |
| Spurt loss, ml | 6 |
| Fluid loss in 4 hours, ml | 23.2 |
| Initial pH/Final pH | 2.97/3.52 |
| Injectivity @ 5 psi, % | 59 |

Example 2

Example 2 is a drilling fluid direct emulsion formulation have a W/O ratio of about 70:30 resulting an inventive drilling fluid having a density of about 9 ppg. The inventive drilling fluid was formulated with 9.21 ppg saturated calcium formate brine as external phase and LVT 200 (i.e., base oil) as internal phase as set forth in TABLE 4.

TABLE 4

Formulation of 9 ppg pill.

| Components | Conc. (ppb) |
|---|---|
| Hydrotreated light distillate(petroleum) | 80.6 |
| Water-soluble brine lubricant | 6.8 |
| Divalent brine system primary viscosifier | 6 |
| Non-ionic/starch derivative filtration-control additive | 6 |
| Divalent brine system secondary viscosifier | 3 |
| Low-density divalent fluid rheology stabilizer | 1 |
| Ca(HCO$_2$)$_2$ salt | 25 |
| 9.21 ppg Ca(HCO$_2$)$_2$ brine | 249.63 |

After 16 hours of hot rolling at 150° F., the fluid sample was reconditioned at 3000 rpm for 10 minutes by Hamilton Beach mixer and fluid rheology data after 16 hours hot-roll is set forth in TABLE 5.

TABLE 5

Fluid rheology data for the formulation of Example 2 after 16 hours of hot rolling at 150° F.

| Fann 35@120° F. | AH |
|---|---|
| 600 | 54 |
| 300 | 35 |
| 200 | 28 |

TABLE 5-continued

Fluid rheology data for the formulation of Example 2
after 16 hours of hot rolling at 150° F..

| Fann 35@120° F. | AH |
|---|---|
| 100 | 20 |
| 6 | 8 |
| 3 | 7 |

Example 3

Example 3 is directed to an inventive FLCP formulation as set forth in TABLE 6 and fluid loss and cleaning up test results for the FLCP formulation of Example 3 are set forth in TABLE 7.

TABLE 6

Formulation of the inventive FLCP formulation of Example 3.

| Components | Conc. (ppb) | Fan 35 @ 120° F. | Dial reading |
|---|---|---|---|
| Clarified xanthan gum viscosifier | 1.5 | 600 RPM | 104 |
| Non-ionic/starch derivative filtration-control additive | 8 | 300 RPM | 75 |
| Self-destructive bridging agent A | 4 | 200 RPM | 62 |
| Self-destructive bridging agent B | 5 | 100 RPM | 45 |
| Lime | 0.5 | 6 RPM | 13 |
| Ca(HCO$_2$)$_2$ salt | 30 | 3 RPM | 11 |
| 9.21 ppg Ca(HCO$_2$)$_2$ | 355.03 | | |

TABLE 7

Test data results for fluid loss and clean up testing of the formulation of Example 3.

| | |
|---|---|
| Broke through, Days | 4 |
| Whole pill soaking, Days | 3 |
| Soaking with water, Days | 1 |
| Soaking Temp, ° F. | 200 |
| Spurt loss, ml | 7 |
| Filtrate collected while broke | 60 |
| Initial pH/Final pH | 10.54/3.62 |
| Injectivity @ 5 psi, % | 74.52 |

Example 4

Example 4 is directed to a FLCP formulation having a density of 10.55 ppg as set forth in TABLE 8 and fluid rheology test results for Example 4 are set forth in TABLE 9.

TABLE 8

Formulation of a FLCP having a density of about 10.55 ppg, wherein the base brine comprises NaCl and has a density of about 10.0 ppg.

| Components | Conc. (ppb) | Fan 35 @ 120° F. | Dial reading |
|---|---|---|---|
| Clarified xanthan gum viscosifier | 1.5 | 600 RPM | 60 |
| Non-ionic/starch derivative filtration-control additive | 8 | 300 RPM | 46 |

TABLE 8-continued

Formulation of a FLCP having a density of about 10.55 ppg, wherein the base brine comprises NaCl and has a density of about 10.0 ppg.

| Components | Conc. (ppb) | Fan 35 @ 120° F. | Dial reading |
|---|---|---|---|
| Sized-sodium chloride particles/water-soluble primary bridging solids A | 5 | 200 RPM | 40 |
| Sized-sodium chloride particles/water-soluble primary bridging solids B | 5 | 100 RPM | 32 |
| Self-destructive bridging agent C | 5 | 6 RPM | 16 |
| Ca(HCO$_2$)$_2$ salt | 40 | 3 RPM | 12 |
| 10.0 ppg NaCl | 378.6 | | |

TABLE 9

Fluid loss and cleaning up data test results at 200° F. for the FLCP formulation of Example 4.

| Broke through, Days | No break (Valve might be plugged) |
|---|---|
| Whole pill soaking, Days | 7 |
| Soaking with water, Days | 1 |
| Soaking Temp, ° F. | 200 |
| Spurt loss, ml | 5 |
| Filtrate collected in 7 days | 24 |
| Initial pH/Final pH | 6.84/4.04 |
| Injectivity @ 5 psi, % | 87.96 |

Example 5

Example 5 is directed to a FLCP formulation having a density of 10.55 ppg as set forth in TABLE 10 and fluid rheology test results for Example 5 are set forth in TABLE 11.

TABLE 10

Formulation of a FLCP having a density of about 13.0 ppg, wherein the base brine comprises NaBr and has a density of about 12.5 ppg.

| Components | Conc. (ppb) | Fan 35 @ 120 °F | Dial reading |
|---|---|---|---|
| Clarified xanthan gum viscosifier | 1.5 | 600 RPM | 111 |
| Non-ionic/starch derivative filtration-control additive | 8 | 300 RPM | 81 |
| Self-destructive bridging agent A | 5 | 200 RPM | 68 |
| Self-destructive bridging agent B | 7 | 100 RPM | 50 |
| Lime | 0.5 | 6 RPM | 17 |
| Ca(HCO$_2$)$_2$ salt | 50 | 3 RPM | 13.5 |
| 12.5 ppg NaBr | 463.61 | | |

TABLE 11

Fluid loss and cleaning up data test results at 200° F. for the FLCP formulation of Example 5.

| | |
|---|---|
| Broke through, Days | 2 |
| Whole pill soaking, Days | 7 |
| Soaking with water, Days | 1 |
| Soaking Temp, ° F. | 200 |
| Spurt loss, ml | 6 |
| Filtrate collected while broke | 38 |

TABLE 11-continued

Fluid loss and cleaning up data test results at 200° F. for the FLCP formulation of Example 5.

| Initial pH/Final pH | 9.45/2.8 |
|---|---|
| Injectivity @ 5 psi, % | 91.87 |

Example 6

Example 6 is directed a FLCP formulation as set forth in TABLE 12 and improved fluid loss control test results for Example 6 are set forth in TABLE 13.

TABLE 12

Formulation of a FLCP, wherein the base brine comprises Na formate and has a density of about 11.0 ppg.

| Components | S.G. | Conc ppb |
|---|---|---|
| Clarified xanthan gum viscosifier | 1.5 | 1.5 |
| Non-ionic/starch derivative filtration-control additive | 1.5 | 8 |
| Lime | 3.34 | 0.5 |
| Sized-sodium chloride particles/water-soluble primary bridging solids A | 2.17 | 4 |
| Sized-sodium chloride particles/water-soluble primary bridging solids B | 2.17 | 6 |
| Ca(HCO$_2$)$_2$ (<38 micron) | 2.02 | 40 |
| Self-destructive bridging agent | 1.24 | 6 |
| 11.ppg Na formate | | 414.9 |

TABLE 13

Fluid loss data test results at 200° F. for the FLCP formulation of Example 6.

| Time | Fluid loss, ml |
|---|---|
| Spurt | 6.0 |
| 30 min | 20.0 |
| 17 hrs | 24.0 |
| 24 hrs | 25.0 |
| 27 hrs | 25.0 |

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A wellbore fluid composition for forming a filter cake, the wellbore fluid composition comprising:
    at least one of an aqueous-based carrier or a base oil;
    at least one viscosifier additive, wherein the at least one viscosifier additive comprises a calcium based divalent brine system viscosifier; and
    at least one bridging agent comprising at least one divalent organic salt in the form of sized-salt particles having particle sizes from about 2 microns to about 1000 microns,
    wherein the wellbore fluid composition is a fluid loss control pill composition or a reservoir drill in fluid composition.

2. The wellbore fluid composition of claim 1, wherein the at least one divalent organic salt has a divalent cation comprising calcium or magnesium and an organic ion comprising carboxylate.

3. The wellbore fluid composition of claim 2, wherein the carboxylate comprises acetate or formate.

4. The wellbore fluid composition of claim 1, wherein the at least one divalent organic salt is present at a concentration of about 2 wt. % to about 30 wt. %, based on a total weight of the wellbore fluid composition.

5. The wellbore fluid composition of claim 4, wherein the concentration of the at least one divalent organic salt is from about 3.5 wt. % to about 15 wt. %, based on the total weight of the wellbore fluid composition.

6. The wellbore fluid composition of claim 5, wherein the concentration of the at least one divalent organic salt is from about 5 wt. % to about 11 wt. %, based on the total weight of the wellbore fluid composition.

7. The wellbore fluid composition of claim 1, wherein the wellbore fluid composition has a density of about 8 ppg to about 15 ppg.

8. The wellbore fluid composition of claim 1, wherein the at least one calcium based divalent brine system viscosifier comprises a concentration in the wellbore fluid composition of about 3 ppb to about 12 ppb.

9. The wellbore fluid composition of claim 1, wherein the wellbore fluid composition is the reservoir drill in fluid composition and the base oil is present and selected from the group consisting of mineral oil, hydrotreated light distillate or petroleum, and a combination thereof.

10. The wellbore fluid composition of claim 1, further comprising at least one self-destructive bridging agent for forming a self-degradable filter cake.

11. The wellbore fluid composition of claim 10, wherein the at least one self-destructive bridging agent comprises polylactic acid.

12. A method of controlling fluid loss in wellbore disposed in a subterranean formation, the method comprising forming a filter cake on at least one surface associated with the wellbore by introducing the wellbore fluid composition of claim 1 into the wellbore.

13. The method of claim 12, wherein the at least one surface comprises at least one selected from one or more pores of the formation, a fracture in the wellbore or the formation, an opening, slit, or slot of a screen device disposed within the wellbore, or a combination thereof.

14. The method of claim 13, further comprising degrading the formed filter cake with a breaker fluid introduced into the wellbore.

15. The method of claim 14, wherein the breaker fluid comprises at least one starch specific enzyme.

16. The method of claim 14, wherein the breaker fluid comprises at least one organic precursor.

17. The method of claim 14, wherein the breaker fluid comprises at least one scale inhibitor.

18. The method of claim 13, wherein the wellbore fluid composition is a self-degradable fluid loss control pill.

19. The method of claim 18, further comprising degrading the formed filter cake internally using self-destructive bridging solid for forming the filter cake.

20. The method of claim 19, wherein the self-destructive bridging solid comprises polylactic acid.

* * * * *